United States Patent
Murray et al.

[11] Patent Number: 6,062,440
[45] Date of Patent: May 16, 2000

[54] SIPPER TUBE CAP ASSEMBLY

[75] Inventors: Dale R. Murray, Elkton, Md.; Edward Moffat, Madison, Wis.

[73] Assignee: Lab Products, Inc., Seaford, Del.

[21] Appl. No.: 09/282,002

[22] Filed: Mar. 29, 1999

[51] Int. Cl.⁷ .................................................... B67D 5/60
[52] U.S. Cl. ........................................ 222/464.1; 222/542
[58] Field of Search ................................ 222/211, 464.1, 222/464.3, 464.5, 321.9, 530, 568, 542, 512

[56] References Cited

U.S. PATENT DOCUMENTS

| | | | |
|---|---|---|---|
| 1,987,689 | 1/1935 | Lewis | 222/464.1 X |
| 2,277,936 | 3/1942 | Rosenblatt | 222/464.1 X |
| 2,728,491 | 12/1955 | Aneshansley | 222/211 X |
| 2,744,661 | 5/1956 | Davis | 222/530 X |
| 2,772,034 | 11/1956 | Richmond, Jr. | 222/542 X |
| 3,050,218 | 8/1962 | Harvey | 222/568 X |
| 3,359,917 | 12/1967 | Cooprider | 222/321.9 X |
| 4,461,406 | 7/1984 | Vannucci | 222/211 |
| 5,301,845 | 4/1994 | Labonte | 222/211 |

*Primary Examiner*—Kenneth Bomberg
*Attorney, Agent, or Firm*—Stroock & Stroock & Lavan LLP

[57] ABSTRACT

A sipper tube cap assembly is provided having a cap with a flat surface and a curved wall. A circumferential flange is formed by the flat surface and further defines an opening in the cap. A stopper, having a hole formed therein, is positioned in said cap by said circumferential flange to retain the stopper within the cap. Finally, a sipper tube is provided which is positioned within the hole in the stopper, to extend through the opening.

10 Claims, 2 Drawing Sheets

SIPPER TUBE CAP ASSEMBLY

BACKGROUND OF THE INVENTION

This invention relates generally to a sipper tube cap assembly for a drinking water bottle, and more particularly to a sipper tube cap assembly for a water bottle which prevents leakage from the bottle, allows for ease of use, and insures that any liquid placed within the bottle and consumed from the sipper top does not come in contact with any caustic or other possibly harmful material.

Bottles utilizing sipper tubes are well known in the industry, and are especially employed for feeding smaller animals who are retained in a cage. The sipper tube allows for the animal to receive water contained in the water bottle. The tube is formed of stainless steel or another acceptable material, and only allows a small amount of the liquid to be obtained at any one time. The remainder of the liquid is retained in the bottle, even though the bottle is inverted. It is well known in the prior art to insert the stainless steel sipper tube inserted into a tapered rubber stopper. The sipper tube is inserted into a hole formed in the middle of the rubber stopper, at the wider end of the tapered stopper. This sipper tube is forced into the hole in the stopper, thereby creating a liquid tight seal between the sipper tube and the stopper by friction fit. This sipper tube and tapered stopper assembly is then forced into the opening of a bottle, thus creating a liquid tight seal between the tapered stopper and the bottle; in effect plugging the bottle. However, this design has caused many problems. First, it is very difficult for a user to force-fit the rubber stopper effectively, completely and confidently into the bottle. Thus, it is possible that after insertion of the stopper and inversion of the bottle, the stopper may loosen itself from the opening of the bottle and come apart from the opening of the bottle. This would in turn break the liquid tight seal between the bottle and stopper, allowing the liquid to escape from the bottle. Additionally, the insertion and removal of this rubber stopper into the mouth of the bottle is a very difficult maneuver for an employee to perform. It requires numerous repetitions, and may result in carpal tunnel syndrome, or additional health risks resulting from the repetitive motion of pulling and pressing on the stopper to remove and replace the stopper.

In an additional prior art design sold by Ancare, a plastic screw cap is employed having a hole formed in the center thereof. A stainless steel sipper tube is force-fit into this opening in the surface of the cap. In the prior art, this cap is typically formed of plastic. The underside of the plastic cap contains a groove around the inner surface of the plastic cap. This groove is filled with a silicone caulk to provide a liquid tight seal between the cap and the bottle when the cap is screwed into the bottle. Because of expansion and contraction rate differences between a plastic cap and the stainless steel sipper tube, this design has resulted in leakage around the sipper tube from the opening in the cap. Therefore, in the prior art, an additional silicone caulk layer has also been employed on the underside of the cap around the sipper tube in order to seal off any possible leakage between the two. However, in the use of this design, concerns have arisen with the silicone caulking coming into contact with the liquid being drunk by the animal. These concerns are especially great when the silicone caulk is used around the sipper tube. Thus, this design has the problem that it places possibly caustic material in contact with the liquid to be drunk by animals. Additionally, after a number of washing cycles, it is possible that the silicone caulk may breakdown, therefore resulting in leakage of liquid from between the sipper tube and the cap. Additionally, the conventional screw cap requires 1½ to 2 full revolutions to secure cap to bottle. This is not only time consuming but increases the potential of carpal tunnel syndrome, or additional health risks after servicing multiple cages.

In a further prior art design manufactured by Allentown Caging Equipment Co., Inc., a plastic or metal cap is combined with a threaded sipper tube assembly and seal. Specifically, the threaded cap has a hole formed in the center thereof through which a special threaded sipper tube is inserted. A teflon or plastic disc with a hole at its center corresponding to the hole in the plastic or metal cap is placed over the end of the sipper tube which was previously inserted into the cap, at the underside of the cap. This teflon or plastic disc therefore creates a seal between the bottle and the cap. Finally, stainless steel nuts are screwed onto the sipper tube on both the top of the cap, and the bottom of the teflon or plastic disc so as to secure the seal and the sipper tube to the cap. Teflon tape may be placed upon the thread of the sipper tube below the teflon disk, and the nut may be screwed over this tape to further aid in insuring that no liquid leaks out from the bottle. However, this prior art design has a number of problems. First, this design requires a large number of parts, and is therefore expensive to design, and requires complicated assembly by the manufacturer or user. Additionally, this design requires a threaded sipper tube, which is not a standard in the industry. Rather the industry standard sipper tube is a non-threaded sipper tube. Furthermore, the caps are not autoclavable, and therefore sterilizing these caps is more difficult. Additionally, the plastic used to form this prior art cap may become brittle if autoclaved and must be replaced rather frequently. The use of a stainless steel metal cap with a hole formed therein is not readily produced in the industry. Finally, the use of a teflon seal requires a very fine tolerance between the teflon seal and the bottle. Failure to meet these tight tolerances result in sporadic leakage problems between the teflon seal, the bottle and the plastic or metal cap. This cap also requires 1 to 2 full revolutions to seal, causing carpal tunnel syndrome in the conventional lab setting with hundreds of cages, each requiring servicing of water bottles.

A further prior art design, manufactured by Thoren Cage, incorporates a stainless steel cap and a stainless steel sipper tube. The cap does not employ any sealing membrane. The sipper tube is flared at its connection point to the cap, and the sipper tube is welded to the cap. The cap is fitted to the neck of the bottle by a friction fit, the sipper cap fitting around the outside thereof. However, this prior art design also has a number of problems. Specifically, this cap assembly only fits a special design bottle neck. The cap and bottle are not common sizes or designs related to the majority of bottles used in the industry. Therefore, in order to utilize such a cap assembly, it would be necessary for a user to replace all bottles with new bottles which were designed to fit with the cap. Additionally this design requires a friction fit between a stainless steel material and the material forming the bottle. If the material forming the bottle is glass there is a tendency for breakage. Lastly, this design is not as secure as threaded designs. Furthermore, it has happened in the industry that the weld between the cap and the sipper tube has broken, thereby causing leakage. Additionally, the repair of this weld is very expensive, and often requires replacement of the cap and sipper tube.

Therefore, it would be beneficial to provide a sipper tube cap assembly for use with a bottle which stopped leakage, was easy to install, could fit on standard size bottles already utilized in the industry, and did not employ any caustic or other materials which may harm any animals coming in contact with the liquid.

SUMMARY OF THE INVENTION

Generally speaking, in accordance with the invention, a sipper tube cap assembly is provided which allows for an animal to obtain liquid from a bottle, stops leakage from the bottle, and overcomes the deficiencies of the prior art. Specifically, the sipper tube cap assembly comprises a short cylindrical cap formed of either autoclavable plastic or stainless steel. The cylindrical cap is threaded on the inside thereof and is threadably coupleable with various threaded bottles which are standard in the industry as the thread design caps provide a more secure fastening method. The cap is further provided with side walls and an open top; a flange extending from the side walls across the top to form an opening therein. A stopper is maintained in the cap by the flange, and a sipper tube fits through the hole formed in the stopper and extends through the opening.

The stopper is formed with a thin neck, bordered by two wider lips. These lips engage opposite sides of the circumferential flange formed on the cap. The neck has a diameter greater than the opening in the flange and at least one lip has a diameter at least coextensive with the flange to abut the cap sidewall.

Therefore, the stopper is secured to the cap, and ensures that there will be no leakage between the cap and the stopper. When the cap is screwed onto a standard threaded bottle, and tightened thereon, the upper edge of the bottle is maintained in pressure contact with the stopper lip which is retained within the cap on the bottle side of the cap, thereby further ensuring a liquid tight seal between the stopper and the plastic cap.

Accordingly, it is an object of this invention to provide an improved sipper tube cap assembly for use with a water bottle.

Another object of the invention is to provide an improved sipper tube cap assembly which does not utilize any caustic material, such as silicone caulking, to ensure that there is no leakage from the bottle.

Another object of the invention is to provide an improved sipper tube cap assembly which can be easily attached to and detached from a standard industry threaded bottle.

Yet another object of the invention is to provide a screw cap requiring less rotation to secure or remove.

A further object of the invention is to provide an improved sipper tube cap assembly whereby standard industry bottles and sipper tubes can be employed in an easy to use, safe, and leak proof assembly.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
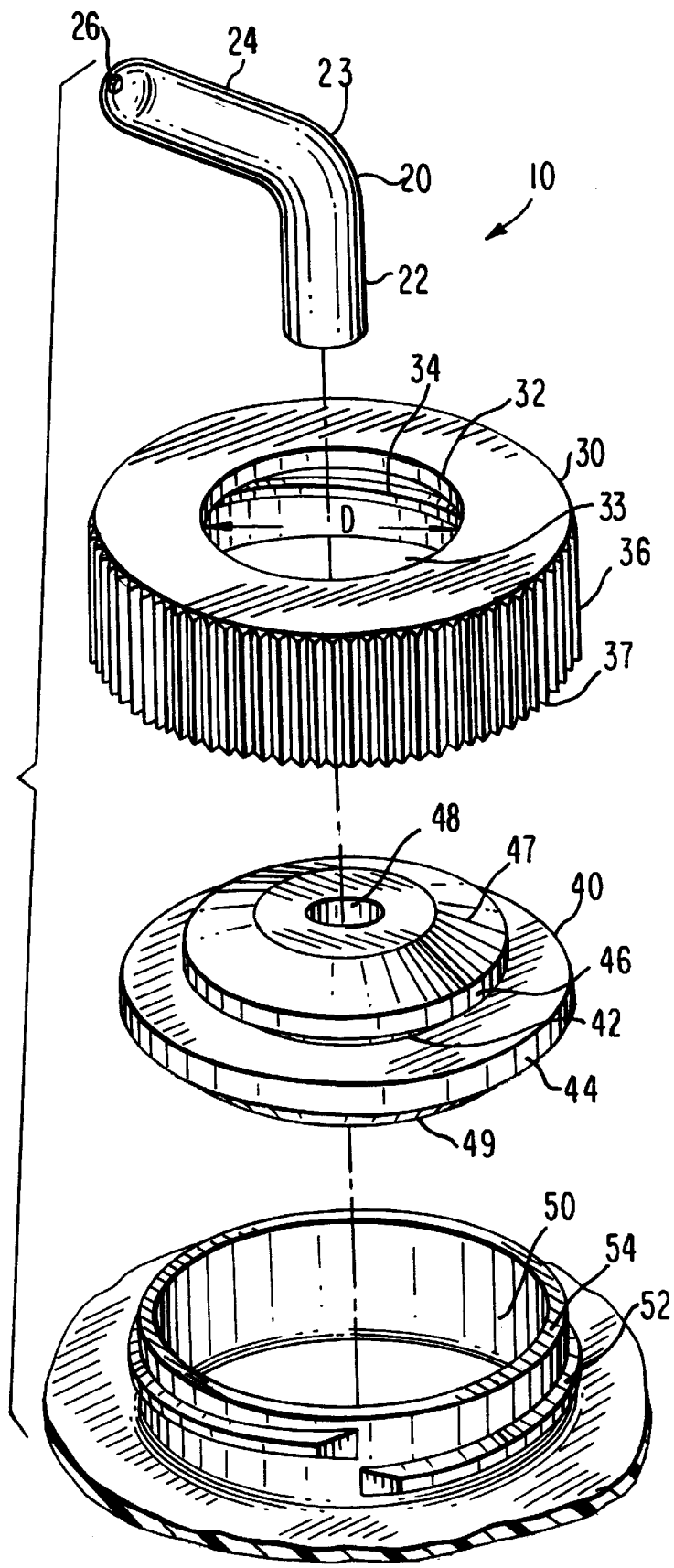
FIG. 1 is an exploded perspective view of a sipper tube cap assembly constructed in accordance with a first embodiment of the invention.

Referring first to FIG. 1, a sipper tube cap assembly indicated generally as 10 is shown. This sipper tube cap assembly 10 includes a sipper tube 20, a cap 30, and a stopper 40. Sipper tube 20 is a standard sipper tube, as is known in the art, and further comprises a vertical portion 22, an angled portion 24 bent about an elbow 23, so that angled portion 24 is retained at a predetermined angle with respect to vertical portion 22. However, it should be noted, that it is possible to provide the relative positioning of these two portions as a straight tube (180° angle), or with any angle therebetween. Sipper tube 20 is further formed with a hole 26 in the end thereof, which allows for liquid to be removed from sipper tube 20.

Cap 30 is preferably formed of an autoclavable plastic or of stainless steel and further includes a curved side wall 37. A flat surface forming a circumferential flange 32 extends inward from the outer edge of side wall 37 across the top of cap 30. Circumferential flange 32 defines an opening 33 formed in cap 30. Opening 33 is formed with a diameter D, which is greater than the diameter of vertical portion 22 of sipper tube 20. Wall 37 is further formed with threads 34 on the inside surface thereof. Additionally, serrations 36 are formed on the outer surface of curved wall 37 of cap 30, facilitating gripping of cap 30 by a user. Cap 30, and threads 34 are dimensioned so as to mesh with threads of the neck of a standard bottle 50; threads 34 engaging standard threads 52 thereon. Bottle 50 is a standard bottle which is known in the industry.

Figure 2:
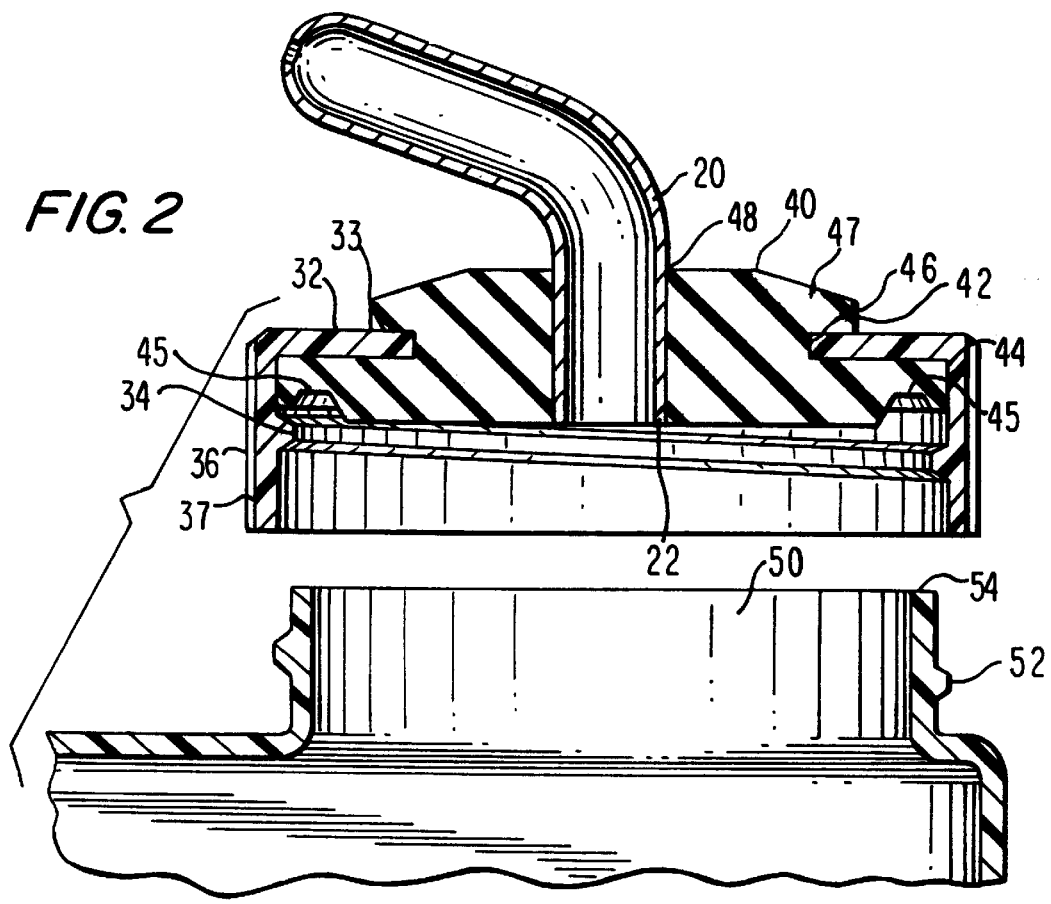
FIG. 2 is a cross sectional diagram depicting the sipper tube cab assembly of FIG. 1 detached from a standard threaded bottle.
Figure 3:
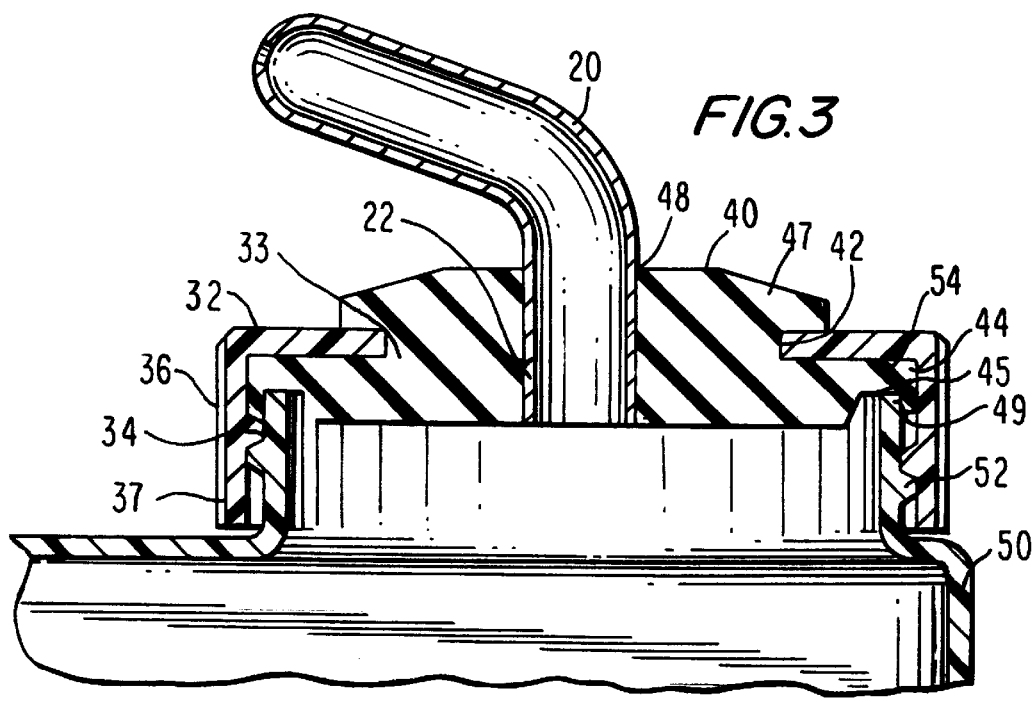
FIG. 3 is a cross sectional view depicting the sipper tube cab assembly of FIG. 1 connected to a standard industry threaded bottle.

Stopper 40 is formed with a first lip 44 and a second lip 46. Both lip 44 and lip 46 have a diameter substantially greater than opening 33. A neck 42 having a diameter less than first lip 44 and second lip 46 is disposed therebetween and has a diameter no smaller than D. Second lip 46 is formed with a slanted upper surface 47. A hole 48 is formed through stopper 40. Stopper 40 is formed of a resilient material, such as rubber, silicone rubber, or any other FDA approved, non-hazardous material or the like. Hole 48 is dimensioned to be slightly smaller than the diameter of vertical portion 22 of sipper tube 20 so that sipper tube 20 may be force-fit within hole 48 stretching stopper 40 around sipper tube 20 and forming a liquid tight seal therebetween. As is also shown in FIGS. 2 and 3, in addition to FIG. 1, stopper 40 is further formed with a channel 45 extending along, and within the perimeter of lip 44. Channel 45 is dimensioned to receive an upper edge 54 of bottle 50. In an alternative embodiment, channel 45 may also be formed so as to extend to the outer periphery of lip 44. Stopper 40 may be formed of a silicone rubber or other pliant malleable material which has been approved for use by the Food and Drug Administration for use with animals.

During use, stopper 40 is fit into opening 33 of cap 30 as is shown in FIG. 2. Because lip 46 has an angled top surface 47 and is formed of a malleable material, lip 46 slides through opening 33 as flange 32 compresses lip 46 and surface 47 slides through opening 33. The larger diameter lip 44 which has no such surface can not pass through opening 33. Lip 44 has a diameter at least coextensive with flange 32 and extending to the outer wall 37. As a result, there is no gap between lip 44 and wall 37. First lip 44 is positioned below circumferential flange 32, and second lip 46 is positioned above circumferential flange 32, neck 42 being positioned adjacent and coaxial with circumferential flange 32. Furthermore, because neck 42 has a diameter no less than the diameter of opening 33, there is no gap between neck 42 and flange 32. Neck 42, lip 44 and lip 46 seal opening 33. In this position, stopper 40 is retained within opening 33 of cap 30.

Neck 54 of bottles 50 do come in a variety of standardized sizes. Necks extend for a particular length depending on the particular standard, i.e., some necks are shorter or longer than other necks. To accommodate this, the length of outer wall 37 extends only to be coextensive with the shortest neck of the standardized sizes. Furthermore, as cap 30 is clamped down around the bottle neck, lip 44 compresses providing a biasing force to separate cap 30 from the bottle neck. This causes a tension fit and positive engagement of threads 34 and 52 so that the cap need only be rotated ½ to ¾ of a revolution to maintain a safe, tight fit. Furthermore, because the material, silicon, rubber or the like, is in effect trying to expand against the top of the cap, it provides a friction surface against the bottom of the cap further preventing any inadvertent loosening of the cap during use. Therefore, a tight seal is provided without twisting to engage all of the neck threads.

In an additional embodiment, rather than first forming the stopper as a separate part and then inserting it into the cap, it is possible to form the stopper around the cap. Specifically, first the cap would be formed. Next, the cap would be placed into the stopper mold, and the material to form the stopper would be placed into the mold and heated (or heated and then placed into the mold). After hardening, the stopper would be formed about the flange in the cap, and the stopper would be heat bonded to the cap, thereby further insuring that no liquid will leak from the cap.

Sipper tube 20 is then force fit into hole 48 of stopper 40. Since the diameter of vertical portion 22 of sipper tube 20 is slightly greater than the diameter of hole 48, sipper tube 20 is force fit into hole 48 to form a liquid tight seal therebetween.

As is further shown in FIG. 3, when cap 30 is screwed onto bottle 50 through the engagement of threads 34 and 52, upper edge 54 of bottle 50 is received in channel 45, and exerts a pressure against channel 45, compressing first lip 44 against flange 32 forming a water tight seal. This pressure maintains the liquid tight seal between the bottle 50, stopper 40, and cap 30.

Through this construction, stopper 40 is insured to remain in contact with cap 30 and sipper tube 20. Additionally, it is possible to provide a liquid tight seal, which may be easily attached to a standard industry bottle, and which does not pose a health risk to any animals utilizing the sipper tube. Furthermore, because there is no gap between stopper 40, outer wall 37 and flange 32, the fluid within the bottle is prevented from contacting flange 32 and no dirt or debris can enter bottle 50. Lastly, because stopper 40 is in contact with and may be compressed by cap 30, cap 30 increases the overall rigidity of stopper 40 giving stability to the drinking tube as it is held in place. Therefore, while tube 20 can rotate about its axis when held by stopper 40, it does not exhibit lateral movement.

It will thus be seen that the objects set forth above, among those made apparent from the preceding description, are efficiently attained and, since certain changes may be made in the above construction without departing form the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A sipper tube cap assembly, comprising:

a cap having a curved side wall having an inner surface and an outer surface;

a circumferential flange extending from said curved side wall and defining an opening in said cap;

a stopper dimensioned to seal said opening, said stopper having a hole therein, said stopper being maintained in said cap by said circumferential flange, said stopper including a first lip, a second lip and a neck positioned between said first and second lips and disposed within said opening, said neck and said second lip each having a diameter, the opening having a diameter less than said neck and said diameter of said first lip being at least as great as the diameter of said circumferential flange; and a sipper tube adapted to be positioned within said hole and extending through said opening.

2. The assembly of claim 1, wherein said second lip further comprises a sloped surface.

3. The assembly of claim 1, wherein said stopper further comprises a channel formed in said first lip.

4. The assembly of claim 3, wherein said channel is dimensioned to receive a top edge of a bottle to form a substantially tight seal therebetween.

5. The assembly of claim 3, wherein said channel extends to an outer periphery of said first lip.

6. The assembly of claim 5, wherein said channel is dimensioned to receive a top edge of a bottle to form a substantially tight seal therebetween.

7. The assembly of claim 1, wherein said stopper is formed of a malleable pliant material.

8. The assembly of claim 1, further comprising serrations formed on said outer surface of said curved wall.

9. The assembly of claim 1, further comprising a thread formed on said inner surface of said curved wall.

10. A method for assembling a sipper tube cap assembly, comprising the steps of:

forming a cap having a curved side wall having an inner surface and an outer surface and a circumferential flange extending from said curved side wall and defining an opening in said cap;

forming a stopper dimensioned to seal said opening having a hole therein, said stopper being maintained in said cap by said circumferential flange, forming said stopper with a first lip, a second lip and a neck positioned between said first and second lips, said neck having a diameter, the opening having a diameter less than the diameter of said neck and said first lip having a diameter extending to said sidewall; and inserting said stopper into said opening of said cap;

positioning said neck within said opening;

positioning a sipper tube within said hole and extending through said opening.

* * * * *